Oct. 2, 1928.  
J. M. SPITZGLASS  
COAL METER  
Filed March 25, 1925  
1,686,351  
6 Sheets-Sheet 1

INVENTOR:  
Jacob M. Spitzglass  
By Nissen & Crane  
ATTYS.

Oct. 2, 1928.                J. M. SPITZGLASS                1,686,351
                                 COAL METER

Filed March 25, 1925          6 Sheets-Sheet 2

INVENTOR:
Jacob M. Spitzglass
By Nissen & Crane
                ATTYS

Oct. 2, 1928.

J. M. SPITZGLASS 1,686,351

COAL METER

Filed March 25, 1925

INVENTOR:
Jacob M. Spitzglass
BY Nissen & Crane
ATTYS.

Oct. 2, 1928.
J. M. SPITZGLASS
COAL METER
Filed March 25, 1925
1,686,351
6 Sheets-Sheet 4
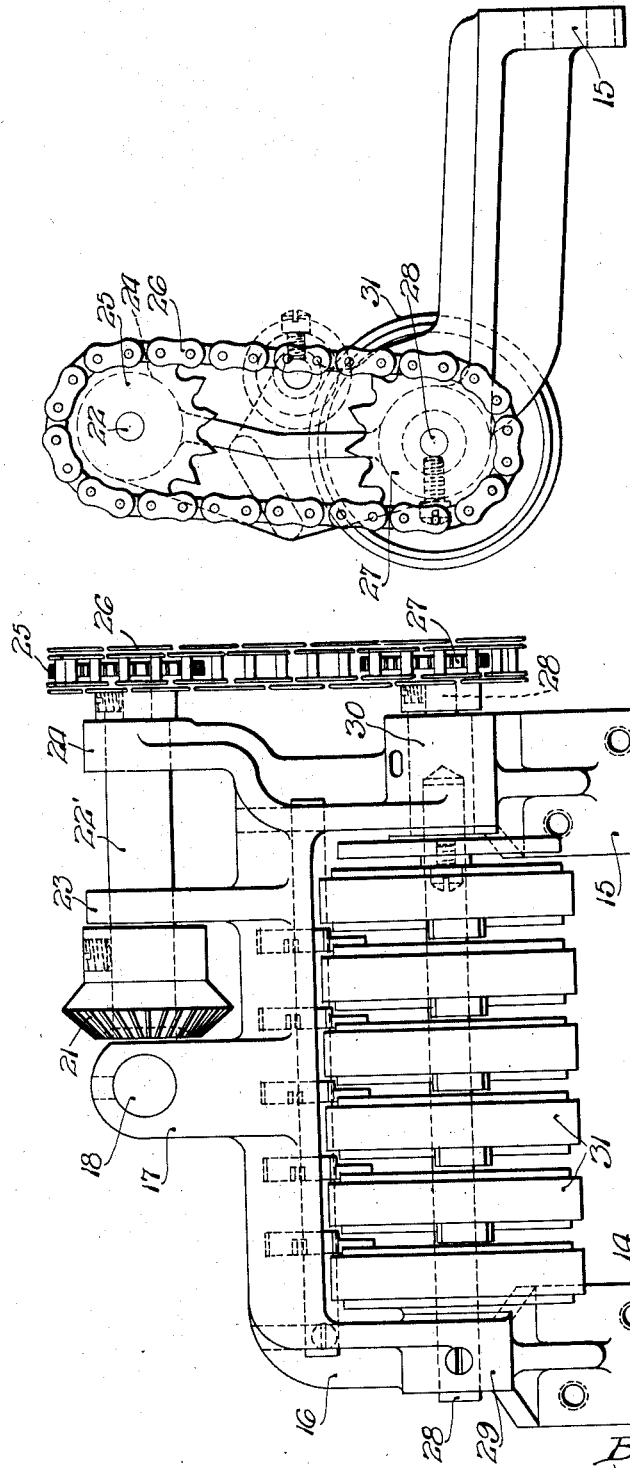
INVENTOR:
Jacob M. Spitzglass
By Nissen & Crane
ATTYS.

Oct. 2, 1928. 1,686,351

J. M. SPITZGLASS

COAL METER

Filed March 25, 1925 6 Sheets-Sheet 5

INVENTOR:
Jacob M. Spitzglass,
BY Nissen & Crane
ATTYS.

Oct. 2, 1928.

J. M. SPITZGLASS

COAL METER

Filed March 25, 1925

INVENTOR:
Jacob M. Spitzglass
By Nissen & Crane
ATTYS.

Patented Oct. 2, 1928.

1,686,351

UNITED STATES PATENT OFFICE.

JACOB M. SPITZGLASS, OF CHICAGO, ILLINOIS, ASSIGNOR TO REPUBLIC FLOW METERS CO., OF CHICAGO, ILLINOIS, A CORPORATION OF ILLINOIS.

COAL METER.

Application filed March 25, 1925. Serial No. 18,194.

This invention relates to mechanism for automatically effecting the volumetric measurement of substances or material in granular or powdered form, particularly fuel fed to an endless chain grate of a furnace by a mechanical stoker, and one of the objects of the invention is the provision of improved and efficient apparatus of this type.

A further object of the invention is the provision of improved and efficient mechanism responsive to the variation in the height of the gate opening of a mechanical stoker and to the variation in the speed of the chain grate to indicate the product of the gate height and the speed of the chain movement thereby giving a reading of the amount of fuel fed into the furnace.

Another object of the invention is the provision of improved mechanism for permitting the same meter to be applied to either side of a mechanical stoker.

Other objects of the invention will appear hereinafter, the novel features and combinations being set forth in the appended claims.

In the drawings—

Fig. 4 is an elevational view of the indicating mechanism and the bracket support for supporting the same;

Fig. 5 is a side view of the structure shown in Fig. 4;

Figure 1:
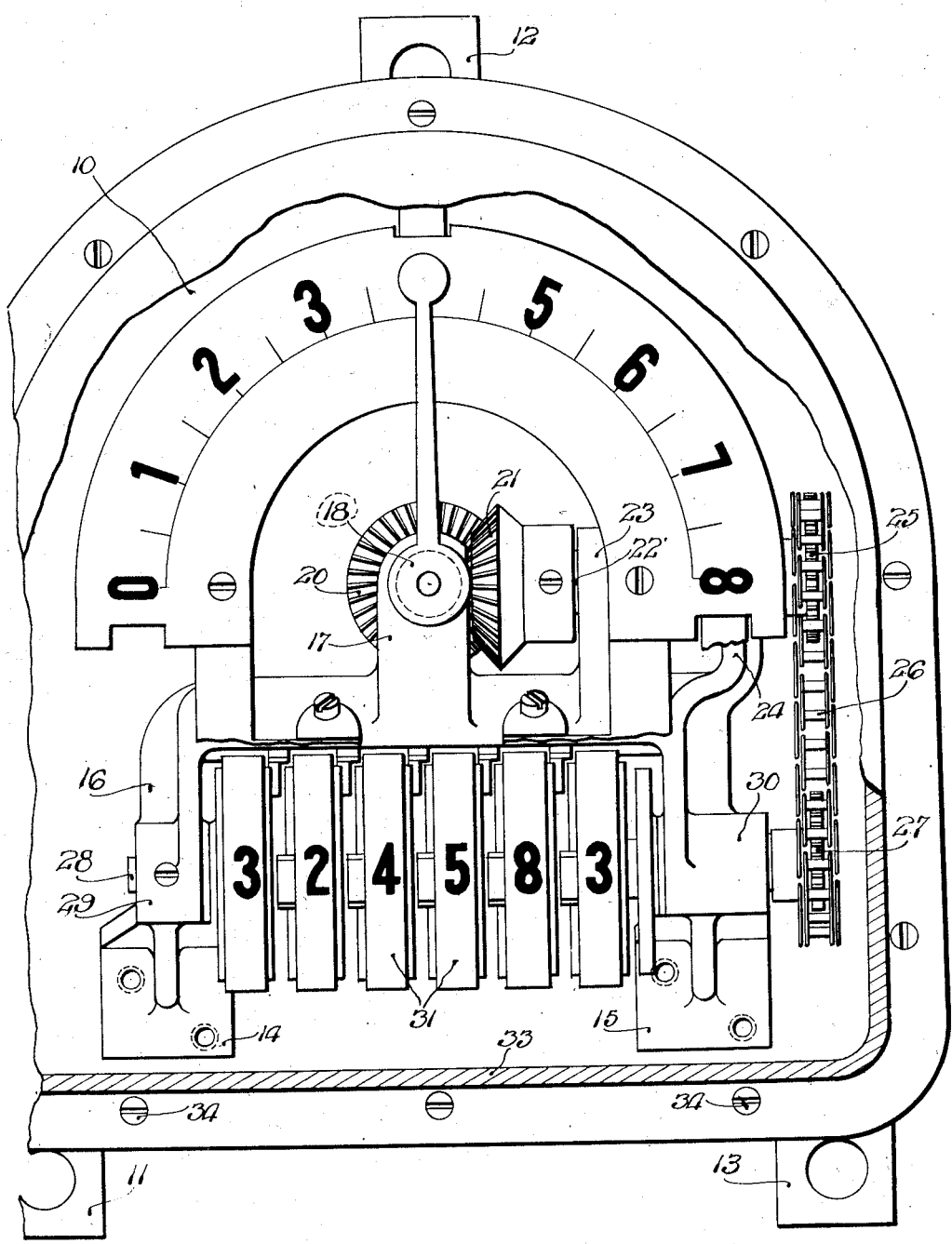
Fig. 1 is an elevational view with a portion of the enclosing casing broken away to show the interior construction.
Figure 2:
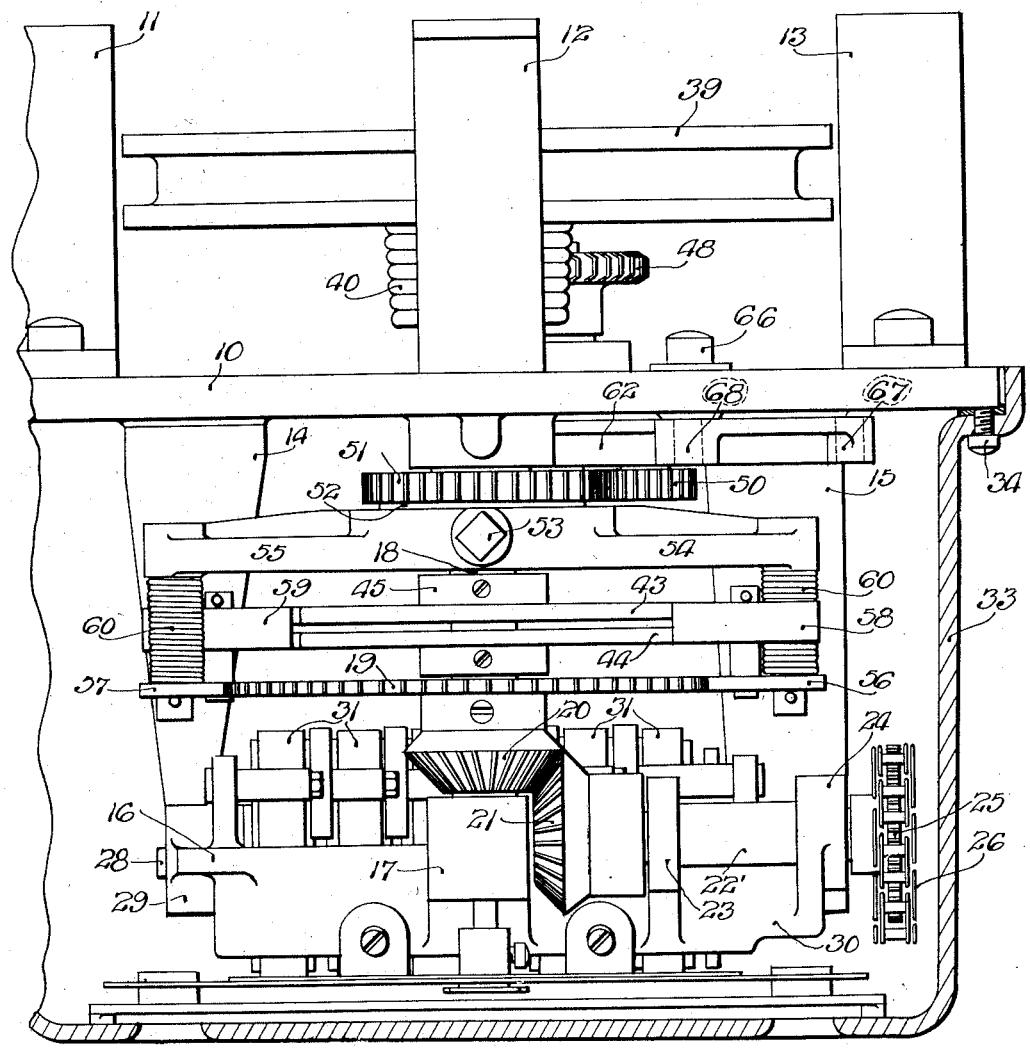
Fig. 2 is a plan view of the construction of the meter, the enclosing casing being shown in sectional plan view.
Figure 3:
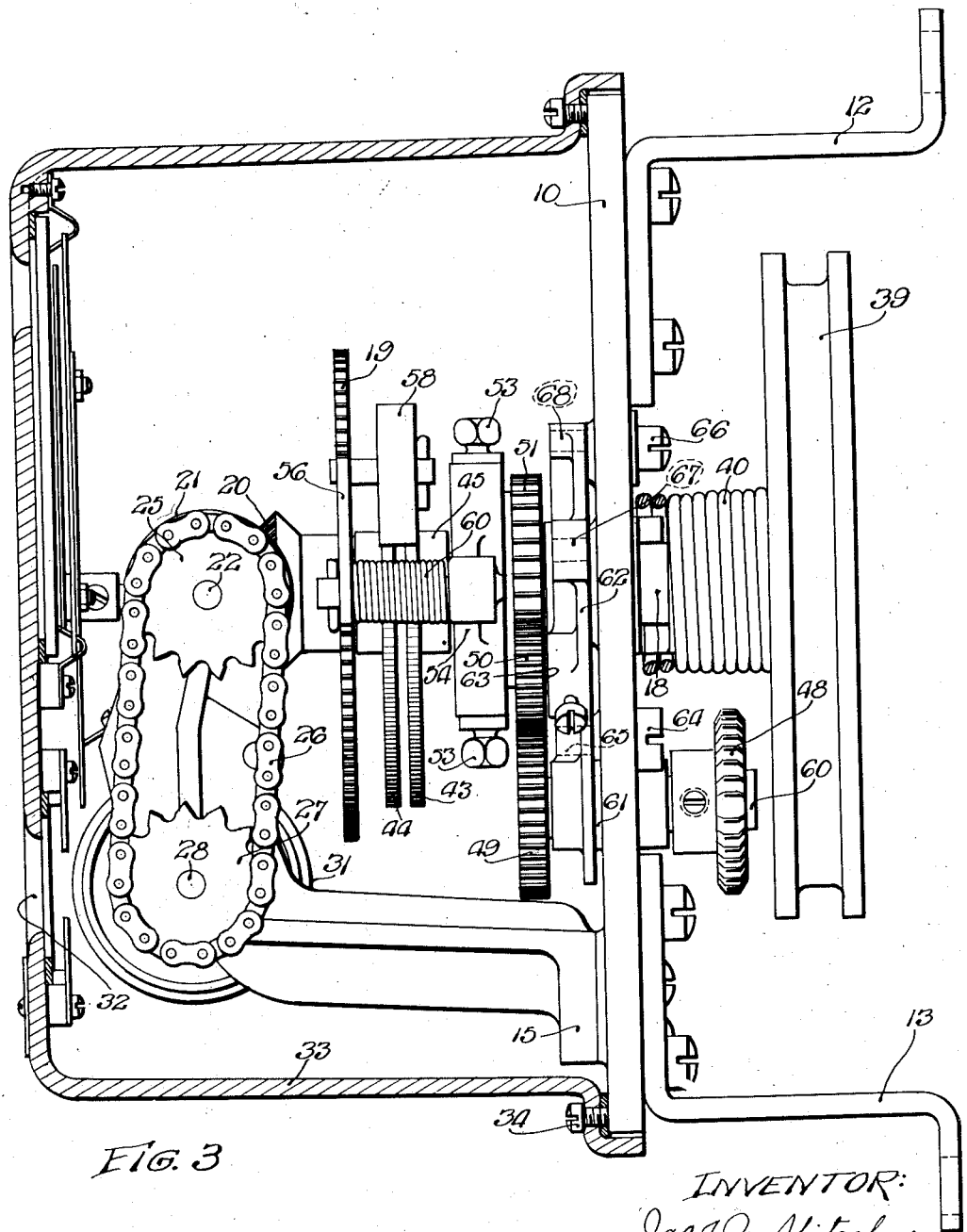
Fig. 3 is an elevational view of the interior construction of the meter, the casing being shown in sectional elevation.
Figure 6:
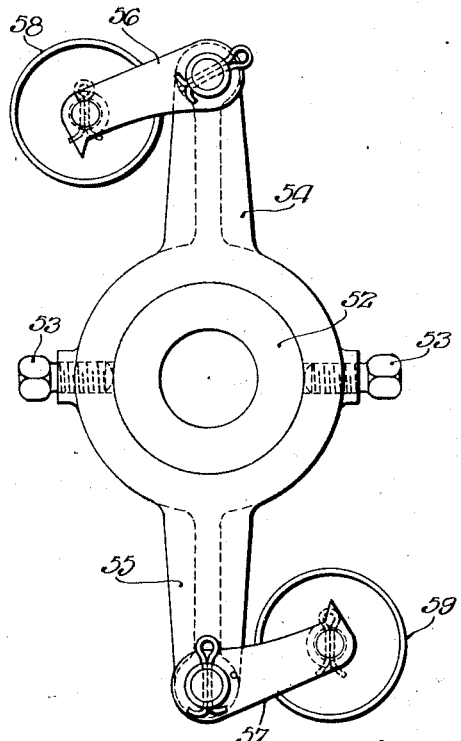
Fig. 6 is an elevational view of the cam roller and pawl mechanism shown assembled in plan view in Fig. 2.
Figure 7:
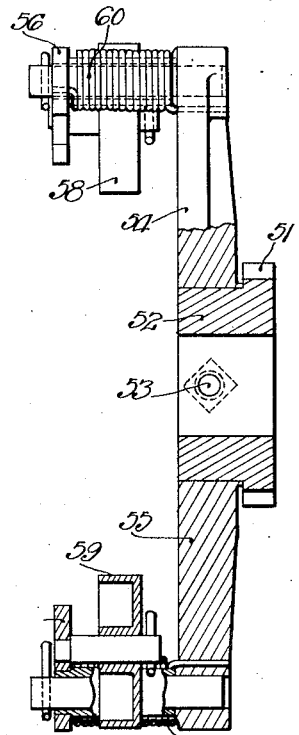
Fig. 7 is a side view, partly in section, of the structure shown in Fig. 6.
Figures 10, 11:
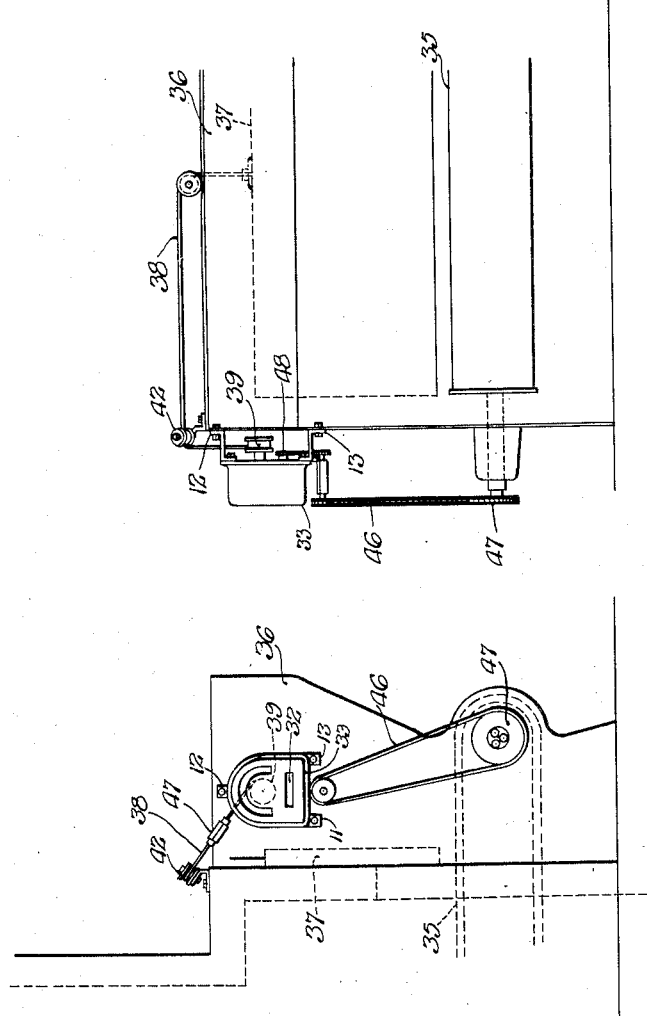
Figs. 10 and 11 are diagrammatic illustrations illustrating the application of the invention to a mechanical stoker.

By referring to Figs. 1, 2 and 3 is will be seen that the vertical plate 10 may be provided with three bracket arms 11, 12, and 13 by means of which the meter may be mounted on the side of a mechanical stoker diagrammatically illustrated in Figs. 10 and 11. Secured at 14 and 15 to the vertical plate 10 is a bracket frame 16 which may consist of an integral casting provided with various supporting bearings as hereinafter described. This supplemental frame 16 comprises an upwardly projecting arm 17 which is adapted to receive a post 18, this post being secured rigidly to the projecting arm 17 and also to the base plate 10 so as to serve as a journal bearing for various rotating parts, including the ratchet wheel 19 and the bevel gear 20 which is secured to the ratchet wheel to rotate therewith. The bevel gear 20 meshes with another bevel gear 21 secured to a shaft 22 journaled in the bearing 23 on one of the arms of the casting 16. The shaft 22 is also journaled in the bearing 24, as shown in Fig. 2. Intermediate the bearings 23 and 24 the shaft 22 is enlarged, as shown in Fig. 2. At the right-hand end of the shaft 22 is a sprocket 25 on which is mounted an endless sprocket chain 26. This sprocket chain meshes with a lower sprocket 27 secured to the shaft 28. This shaft 28 is journaled in the bearings 29 and 30. On the shaft 28 are mounted the register wheels 31 each of which consists of a drum with ten numerals thereon, the mechanism being such that when a drum at the right makes a complete rotation it will advance the next drum to the left one unit and thereby give a reading through a window 32 in the casing 33. For instance, if the wheels are in the positions shown in Fig. 1 the reading through the window 32 would be "324583". The casing 33 may be secured at 34 to the vertical plate 10 so as to be detachable from the latter.

The registering mechanism is operated by rotating the ratchet wheel 19. The mechanism for operating this ratchet wheel is connected to the mechanical stoker, as shown in Figs. 10 and 11, and is operated automatically to record accurately the volume of coal fed into the furnace by the mechanical stoker. As the traveling grate 35 travels into the furnace it carries the coal with it from the hopper 36. The amount of coal fed into the furnace is regulated by the height of the gate 37. The upper end of this gate is connected by a cable 38 to the pulley 39 mounted at the back of the plate 10 for rotation relative to the latter. The pulley 39 is secured to a shaft which extends horizontally through the fixed post 18; therefore the pulley 39 is in fixed relation to the plate 10 but has a limited degree of rotary movement relatively thereto. A retracting spring 40 is connected to the back of the plate 10 and also to the pulley 39. This retracting spring also acts as a counterbalance against the weight of the gate 37 and facilitates lifting and lowering this gate. A turnbuckle 41 may be located, if desired, between the pulley 39 at the back of the plate 10 and the directing pulley 42, as shown in Fig. 10. Secured to the shaft on which the pulley 39 is mounted is a cam 43 which is semi-circular in shape and in its initial position registers with the cam plate 44 mounted on the post 18 and secured to the latter. Limit stops are provided in connection with the shaft on which the pulley 39 is mounted to prevent the spring 40 from moving the cam plate 43 beyond its position in registry with the fixed plate 44. It should be understood that the cam plate 44 is fixed rigidly to the plate 10 and is also in rigid position relative to the bracket casting 16. As shown in Fig. 3, when the parts are in initial position the lower halves of the semi-circular cam plates 43 and 44 project downwardly, their upper surfaces being on inclined planes so as to conform to the hub 45 of the plate 43. The diametrically opposite corners or edges are in horizontal planes and are chamfered for the sake of accuracy as hereinafter described.

By referring to Fig. 10 it will be seen that a chain drive 46 is connected between a sprocket 47 on the chain grate mechanism, and the sprocket 48 at the back of the plate 10 of the meter. The sprocket 48 is connected to the gear wheel 49 to drive the latter and this gear meshes with an idler 50 which in turn meshes with the gear 51. This gear 51 is mounted loosely on the post 18 and is provided with a bushing 52 which is secured by means of the set screws 53 to the spider comprising the two arms 54 and 55. These arms carry pawls 56 and 57 which are spring-pressed toward the center of rotation of the spider. The pawl arms 56 and 57 are also provided with rollers 58 and 59, respectively, and are mounted in position to engage the cams 43 and 44, as shown in Fig. 3. The position of the cam 43 as determined by the width of the gate opening controls the operation of the pawls 56 and 57 because only when the rollers 58 and 59 are out of engagement with the cams 43 and 44 can the pawls 56 and 57 act on the ratchet wheel 19 to give the latter an arc of movement or rotation to effect operation of the register wheels 31.

Figure 8:
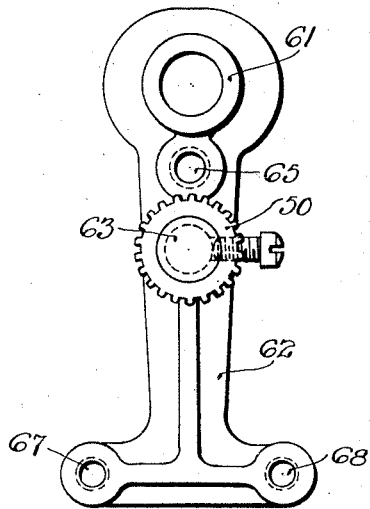
Fig. 8 is an elevational view of the mechanism in the meter for supporting the gear wheels to produce the proper driving direction of the indicating mechanism when the latter is applied to either one side or the other of the mechanical stoker.
Figure 9:
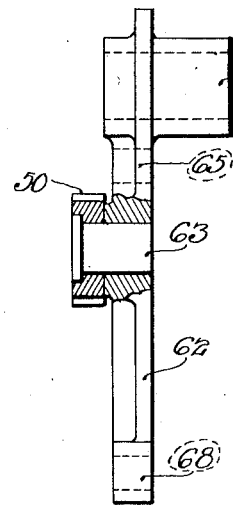
Fig. 9 is an elevational view of Fig. 8 with certain portions in section.

The sprocket 48 and gear wheel 49 are both fixed to a stud shaft 60 which is journaled in a sleeve 61 formed on the lower end of a bracket 62 shown best in Figs. 8 and 9. The idler 50 is journaled on a stud 63 supported by the bracket 62. The bracket is connected to the plate 10 by a screw 64 which is threaded into an opening 65 in the bracket and by a screw 66 which may be threaded into either one of two openings 67 and 68 in the upper end of the bracket. The plate 10 is provided with an enlarged opening for the sleeve 61 to permit the bracket to swing about the screw 64 as a pivot. If the screw 66 is placed in engagement with the opening 68 the gear wheel 49 will be thrown into engagement with the gear 51 instead of the pinion 50. If the screw 66 engages the opening 67 then the idler 50 will engage the gear 51 as previously described. It will thus be seen that the bracket 62 may be shifted to drive the gear 51 in the proper direction irrespective of the direction of rotation of the sprocket wheel 48. This permits the instrument to be connected to either end of the stoker shaft and yet to operate in the proper direction.

It will be seen that when the parts are connected as described, the gear 51 and consequently the bracket 54 which carries the pawl arms 56 and 57 will be rotated at a speed proportional to the travel of the conveyer 35. At the same time as the gate 37 is opened the cam 43 will be rotated by the spring 40 toward the position of registration with the cam 44. When the gate is entirely closed the cams 43 and 44 are directly opposed in position so as to provide a complete circular track for the cam rollers 58 and 59 thus retaining the pawls 56 and 57 in an inoperative position. As the gate is opened the rotation of the cam 43 will permit the pawls 56 and 57 to engage the ratchet wheel 19 through various arcs of movement proportionate to the amount of opening of the gate. When the cams 43 and 44 are in registration and the gate entirely open one of the pawls will be permitted to enter the teeth of the ratchet wheel simultaneously with the lifting of the other pawl so that a continuous rotation of the ratchet wheel 19 will be effected. The speed of rotation of the ratchet wheel 19 is therefore proportional to the speed of travel of the conveyer and the arc of rotation at each revolution of the pawl carrying bracket will be proportional to the opening for the fuel. Thus the rotation of the ratchet wheel 19 is a function of the two factors which determine the amount of fuel fed to the boiler and consequently an integration of the total rotation of the ratchet wheel 19 for any period of time will constitute a measurement of the coal fed during that period of time. The counter-wheels 31 effect such integration and may therefore be made to show directly the amount of fuel fed to the furnace over any given period of time.

I claim:—

1. A meter for measuring the flow of granular or powdered material comprising a counter, a movable member actuated in sympathy with the rate of flow of said material for driving said counter, cam mechanism for controlling the connection between said movable member and counter, and means for setting said cam mechanism to accord with the quantity of flow of said material.

2. A meter for measuring the flow of powdered or granular material comprising a counter, means for driving said counter at a rate of speed proportional to the rate of flow of said material, ratchet mechanism interposed between said counter and driving means, and means for controlling said ratchet mechanism to transmit movement to said counter proportional to the quantity of flow of said material.

3. A meter for measuring the flow of granular or pulverized material comprising a counter, means for driving said counter at a rate of speed proportional to the rate of flow of said material, ratchet mechanism for transmitting movement from said driving means to said counter, cam mechanism for controlling the amount of movement of said ratchet mechanism, and means for setting said cam mechanism to accord with the quantity flow of said material.

4. In mechanism for conveying granular or pulverized material having means for controlling the supply of said material to said conveying mechanism, a meter for measuring the quantity of material transported by said conveying mechanism, said meter comprising a counter, means actuated in synchronism with said conveying mechanism for driving said counter, cam mechanism for controlling the connection between driving means and counter, and means for adjusting said cam mechanism to accord with the means for controlling the supply of material to said conveying mechanism.

5. In mechanism for conveying granular or pulverized material, having a regulator for controlling the supply of material to said conveying mechanism, a meter for integrating the quantity of material transferred by said conveying mechanism, said meter comprising a counter, a drive for said counter actuated in synchronism with said conveying mechanism, ratchet mechanism for transmitting movement from said drive to said counter, and means controlled by said regulator for causing said ratchet mechanism to be actuated by varying amounts according to the adjustment of said regulator.

6. In mechanism for conveying powdered or granular material having a regulator for controlling the supply of material to said conveying mechanism, a meter for integrating the amount of material transferred by said conveying mechanism, said meter comprising a counter, a drive for said counter actuated in synchronism with said conveying mechanism, ratchet mechanism for connecting said drive and counter, cam mechanism for controlling the operation of said ratchet mechanism, and means for setting said cam mechanism to accord with the adjustment of said regulator.

7. A meter for integrating a function of two variables comprising a counter, means for driving said counter at a rate of speed proportional to one of said variables, and a cam for controlling the connection between said counter and driving means to effect connections for periods of time commensurate with the other of said variables.

8. A meter for integrating a function of two variables comprising a counter, means for driving said counter at a rate of speed proportional to one of said variables, and ratchet mechanism for effecting connection between said counter and driving means for periods of time commensurate with the other of said variables.

9. A meter for integrating a function of two variables comprising a counter, means for driving said counter at a rate of speed proportional to one of said variables, ratchet mechanism for transmitting movement from said driving means to said counter, and cam mechanism for controlling said ratchet mechanisms to effect connection between said driving means and counter for periods of time commensurate with the other of said variables.

10. A meter comprising a counter, a ratchet wheel for driving said counter, a pawl for actuating said ratchet wheel, cam mechanism for controlling the connection between said pawl and ratchet wheel, and means for adjusting said cam mechanism to vary the period of connection between said pawl and ratchet wheel.

11. A meter for integrating a function of two variables comprising a counter, a ratchet wheel for driving said counter, a pawl for actuating said ratchet wheel, means for driving said pawl at a rate of speed commensurate with one of said variables, means for controlling the engagement between said pawl and ratchet wheel, and means for setting said controlling means to permit engagement between said pawl and ratchet wheel for intervals of time commensurate with the other of said variables.

12. In mechanism for conveying granular or pulverized material having a regulator for controlling the supply of material to said conveying mechanism, a meter for integrating the quantity of material transferred by said conveying mechanism, said meter comprising a counter, a ratchet wheel for driving said counter, a pawl for actuating said ratchet wheel, a cam for controlling the periods of engagement between said pawl and ratchet wheel, means for driving said pawl at a rate of speed proportional to the speed of travel of said conveying mechanism, and means for adjusting said cam to accord with the position of said regulating means.

13. In a conveyer for granular or pulverized material having a regulator for controlling the supply of material to said conveyer, a meter for integrating the quantity of material transferred by said conveyer, said meter comprising a counter, a ratchet wheel for driving said counter, a pawl actuated in synchronism with said conveyer for driving said ratchet wheel, cam mechanism arranged to prevent engagement between said pawl and ratchet wheel for a portion of the movement of said pawl, and means adjustable in unison with the adjustment of said regulator for extending or restricting the extent of said cam.

14. A meter comprising a counter, a ratchet wheel for actuating said counter, a pair of pawls for driving said ratchet wheels, and a cam for controlling the engagement between said pawls and ratchet wheel, said cam being shaped to disengage one of said pawls from said ratchet wheel and simultaneously to permit engagement of the other of said pawls with said ratchet wheel to provide continuous rotation of said ratchet wheel for one adjustment of said cam.

15. A meter comprising a counter, a ratchet wheel for driving said counter, a pair of pawls for actuating said ratchet wheel, and cam mechanism for controlling engagement of said pawls with said ratchet wheel shaped to afford continuous rotation of said ratchet wheel for one adjustment of said cam mechanism but providing interrupted rotation of said ratchet wheel for a different adjustment of said cam mechanism.

16. A meter comprising a counter, a ratchet wheel for driving said counter, a pair of pawls for actuating said ratchet wheel, a cam for controlling the engagement between said pawls and ratchet wheel, and a second cam movable relative to said first cam to vary the intervals of engagement between said pawls and ratchet wheel.

17. A meter comprising a counter, a ratchet wheel for driving said counter, a pair of pawls for actuating said ratchet wheel, means for driving said pawls at a rate of speed commensurate with a variable quantity, a fixed cam for intercepting the connection between said pawls and ratchet wheel but permitting engagement of at least one of said pawls with said ratchet wheel at all times, a movable pawl for increasing the effective arc of said fixed pawl to interrupt the actuation of said ratchet wheel by said pawls, and means for adjusting the position of said movable pawl in accordance with a second variable.

18. In a conveyer for granular or pulverized material having a regulator for controlling the supply of material to said conveyer, a counter, ratchet mechanism for transmitting movement from said conveyer to said counter, a cam for controlling said ratchet mechanism, a spring for setting said cam in position to permit continuous actuation of said counter, and means connected with said regulator for adjusting said cam against the tension of said spring to provide interrupted actuation of said counter by said ratchet mechanism.

19. In a conveyer for granular or pulverized material having a regulator for controlling the supply of material to said conveyer, a counter, ratchet mechanism for transmitting movement from said conveyer to said counter, a pair of complementary cams for controlling said ratchet mechanism, a spring for automatically setting said cams in position to permit continuous movement of said counter by said conveyer, and means connected with said regulator to adjust said complementary cams to provide interrupted movement of said counter when said regulator is set to supply less than a maximum quantity of material to said conveyer.

In testimony whereof I have signed my name, to this specification on this 17th day of March, A. D. 1925.

JACOB M. SPITZGLASS.